United States Patent [19]

Londrigan et al.

[11] Patent Number: 5,164,422
[45] Date of Patent: Nov. 17, 1992

[54] MANUFACTURE OF POLYISOCYANATE PREPOLYMERS USING ETHYLENE GLYCOL AND CELLULAR FOAMS THEREFROM

[75] Inventors: Michael E. Londrigan, Clearwater; Scott C. Snider, St. Petersburg; Kenneth G. Trout, Tampa, all of Fla.

[73] Assignee: The Celotex Corporation, Tampa, Fla.

[21] Appl. No.: 796,956

[22] Filed: Nov. 25, 1991

Related U.S. Application Data

[63] Continuation of Ser. No. 484,746, Feb. 26, 1990, abandoned.

[51] Int. Cl.⁵ .............................................. C08G 18/00
[52] U.S. Cl. .................................... 521/159; 521/173; 521/174; 521/182; 521/902
[58] Field of Search ............... 521/109, 173, 174, 182, 521/902

[56] References Cited

U.S. PATENT DOCUMENTS

| | | | |
|---|---|---|---|
| 4,237,238 | 12/1980 | DeGuiseppi et al. | 521/131 |
| 4,346,229 | 8/1982 | Derr et al. | 560/91 |
| 4,411,949 | 10/1983 | Snider et al. | 428/304.4 |
| 4,417,001 | 11/1983 | Svoboda et al. | 521/114 |
| 4,439,550 | 3/1984 | Brennan | 521/131 |
| 4,469,824 | 9/1984 | Grigsby, Jr. et al. | 521/173 |
| 4,521,611 | 6/1985 | Magnus | 560/91 |
| 4,526,908 | 7/1985 | Magnus et al. | 521/172 |
| 4,636,530 | 1/1987 | Narayan | 521/159 |
| 4,720,571 | 1/1988 | Trowell | 560/91 |
| 4,758,607 | 7/1988 | Hallmark et al. | 521/172 |
| 4,791,148 | 12/1988 | Riley et al. | 521/159 |

Primary Examiner—John Kight, III
Assistant Examiner—Duc Truong
Attorney, Agent, or Firm—Charles W. Vanecek

[57] ABSTRACT

An isocyanate-terminated quasi-prepolymer is prepared by reacting an organic polyisocyanate and a polyester polyol which comprises the reaction product of a polycarboxylic acid component and ethylene glycol or a mixture of ethylene glycol and at least one other glycol. The use of the quasi-prepolymer in the preparation of rigid cellular polymers, especially polyisocyanurate foams, enhances the thermal insulating properties of the foams, and helps to reduce their cost and blowing agent usage.

24 Claims, No Drawings

MANUFACTURE OF POLYISOCYANATE PREPOLYMERS USING ETHYLENE GLYCOL AND CELLULAR FOAMS THEREFROM

This is a continuation of application Ser. No. 07/484,746 filed Feb. 26, 1990, now abandoned.

BACKGROUND OF THE INVENTION

1. Field of the Invention

This invention relates to the preparation of rigid cellular polymer materials, particularly polyisocyanurate and polyurethane foams, characterized by improved insulating properties and a reduced blowing agent requirement. More particularly, the invention relates to the preparation of these improved foams by using a polyisocyanate prepolymer derived from a polyester polyol made from ethylene glycol.

2. Description of the Prior Art

The preparation of foams characterized by isocyanurate and urethane linkages is well known in the art. Generally, these foams are prepared by reacting an organic polyisocyanate with a polyol in the presence of a blowing agent and a catalyst(s). Polyester polyols of many types can be used as the polyol components in the production of these foams.

Because of the relatively high cost of various typical polyols useful in making cellular polymers and because an inexpensive source of polyols is now available from such sources as crude dimethyl terephthalate oxidate residues, recycled poly (ethylene terephthalates), and various other scrap polyester sources, efforts have heretofore been directed to processes for converting these materials to commercially useful polyester polyols. These efforts have led to a number of polyester polyols found to be highly suitable in producing foams of good quality.

It is also known that polyols, including certain aromatic polyester polyols, can be reacted with isocyanates to form isocyanate-terminated quasi-prepolymers which in turn can be used in the formation of polyurethane and/or polyisocyanurate foams, as disclosed, e.g., in U.S. Pat. No. 4,791,148.

A most important characteristic of rigid foams is their insulating value which is expressed by the k- and aged k- factor. The k-factor is a measurement of the insulating properties (thermoconductivity) and the aged k-factor indicates insulating properties over time. The foams of U.S. Pat. No. 4,791,148 which are prepared from polyisocyanate prepolymers derived from diethylene glycol-based polyester polyols exhibit low initial thermal conductivity values and maintain low thermal conductivity values after prolonged periods of use.

The insulating value of the rigid foams is dependent, among other things, on the type and amount of the blowing agent(s) employed in their preparation. Since these agents make up a considerable proportion of the foam and can add significantly to its cost, any way of bringing about a reduction in their amount needed in the foam production while still yielding the above-noted low initial and aged thermal conductivity values would be very advantageous. Additionally, the chlorofluorocarbon blowing agents have come under attack in recent years on the grounds that they give rise to environmental problems concerned with ozone depletion in the stratosphere, and efforts are ongoing to find ways of reducing their use in foam production.

OBJECTS OF THE INVENTION

It is accordingly an object of the present invention to provide improved rigid plastic foams, especially polyisocyanurate and polyurethane foams, having a combination of advantageous properties, including excellent thermal insulative properties, reduced blowing agent requirement, low friability, and good dimensional stability, thermal resistance, and compressive strength, and an improved method of producing the foams.

It is another object of the present invention to provide closed cell foam materials which can be used in building panels which are highly insulating, thermally resistant, low in friability, and soundproof.

It is a further object of the present invention to provide a polyester polyol-containing composition for use in the preparation of rigid plastic foams having a combination of advantageous properties, especially an improved insulating efficiency and a reduced blowing agent requirement.

DESCRIPTION OF THE INVENTION

The above objects have been achieved by the use of a polyisocyanate prepolymer derived from a polyester polyol composition prepared from a sufficient proportion of ethylene glycol for the formation of rigid plastic foams having improved insulating properties and a reduced blowing agent requirement. While it is known that polyisocyanate prepolymers made from organic isocyanates and polyester polyol compositions can contribute to the formation of low k-factor foams, it has now been surprisingly discovered that the specific use of ethylene glycol in the preparation of the polyester polyols results in the production of foams having both low k-factor and a reduced usage of blowing agent to achieve this lowered k-factor.

The polyisocyanate prepolymers (quasi-prepolymers) may be prepared by reacting an excess of an organic polyisocyanate or a mixture of polyisocyanates with a minor amount of a polyester polyol derived from ethylene glycol. The latter polyester polyol compositions may be prepared by reacting a polycarboxylic acid and/or acid derivative with a polyol component comprising ethylene glycol or a mixture of ethylene glycol and at least one other glycol. The improved foams of the invention advantageously comprise polyisocyanurate and polyurethane foams prepared by reacting together the isocyanate-terminated quasi-prepolymer and a polyester polyol composition, which may be the same as the ethyleneglycol-derived polyester polyol use in making the quasi-prepolymer or a different polyester polyol or combinations of these polyester polyols, and optionally other polyhydroxyl compounds in the presence of a blowing agent(s). The reaction may be carried out in the presence of catalysts, auxiliaries and additives as required (e.g., a surfactant).

The preparation of the quasi-prepolymer is accomplished simply by reacting the isocyanate and polyester polyol in a suitable reaction vessel, generally in an inert (nitrogen) atmosphere. The isocyanate is preferably brought to approximately 25° to 100° C. before addition of polyester polyol, which is added gradually with stirring over a period of time generally between 15 minutes and several hours. A modest exotherm is allowed to develop and the reaction is continued (e.g., at a temperature from about 25°-100° C.) until the desired NCO content is reached, after which the product is discharged. Generally, the quasi-prepolymers have a free isocyanate content of from 16.8 % to 30.0 %, preferably 24.0 % to 29.0 %, by weight.

The quantity of polyester polyol which is reacted with the isocyanate may vary, but generally is not less than 2 percent and not more than 30 percent relative to the weight of the final quasi-prepolymer, and preferably 20 percent or less. The stoichiometry must be such that sufficient equivalents of isocyanate are present to insure that the finished quasi-prepolymer will be isocyanate-terminated, as is well known to those skilled in the art. The polyester polyol is used in a predetermined amount sufficient to produce reactive polyisocyanate prepolymers of the desired equivalent weight (e.g., 140 to 250) and significant excess isocyanate functionality. Examples of analogous formulations and their stoichiometrics may be found in POLYURETHANES: CHEMISTRY AND TECHNOLOGY, volumes I and II, by Saunders and Frisch, published by Wiley-Interscience.

Catalysis is generally not required to form the quasi-prepolymers, and it is undesirable to include non-removable catalysts whose residual catalytic effect would cause further polymerization leading to undesirable increases in viscosity during storage. However, catalysts which do not promote the reaction of isocyanate groups with each other may be used, especially when the quasi-prepolymer is to be foamed within a short time.

Catalysts suitable for the preparation of the isocyanate-terminated prepolymers are, for example, the various alkyl tin carboxylates and tin carboxylates. Preferably used when catalysis is desired, for example, are tin-(II) octoate, and dibutyl tin dilaurate. When catalysts are used, they may be present in amounts at from 0.005 to 2 percent by weight, preferably from 0.01 to 0.1 percent by weight. As indicated previously, preferably no catalyst is utilized.

The organic isocyanates to be reacted with the ethylene glycol-derived polyester polyols have a functionality of two or higher. For example, organic diisocyanates, polyisocyanates, or mixtures thereof may h=used successfully. The organic isocyanates may be aliphatic, cycloaliphatic, alicyclic, aromatic or aromatic aliphatic isocyanates. The various isocyanates suitable for the preparation of the quasi-prepolymers of the invention are well known to those skilled in the art.

Among the many isocyanates suitable for the practice of the subject invention are, for example, aliphatic isocyanates such as tetramethylene, hexamethylene, octamethylene and decamethylene diisocyanates, and their alkyl substituted homologs; cycloaliphatic isocyanates such as 1,2-, 1,3- and 1,4-cyclohexane diisocyanates, 2,4- and 2,6-methylcyclohexane diisocyanates, 4,4'- and 2,4'-dicyclohexyldiisocyanates, 4,4'- and 2,4'-dicyclohexylmethane diisocyanates, 1,3,5-cyclohexane triisocyanates, and saturated (hydrogenated) polymethylenepolyphenylenepolyisocyanates; alicyclic isocyanates such as isocyanatomethylcyclohexane isocyanates, isocyanatoethylcyclohexane isocyanates, bis-(isocyanatomethyl) cyclohexane diisocyanates, 4,4'- and 2,4'-bis(isocyanatomethyl) dicyclohexane, and isophorone diisocyanate; aromatic isocyanates such as 1,2-, 1,3-, and 1,4-phenylene diisocyanates, 2,4- and 2,6-toluene diisocyanate, 2,4'-, 4,4'- and 2,2-biphenyl diisocyanates, 2,2'-, 2,4'- and 4,4'-diphenylmethane diisocyanates, and polymethylenepolyphenylenepolyisocyanates (polymeric MDI); and aromatic aliphatic isocyanates such as 1,2-, 1,3-, and 1,4-xylylene diisocyanates.

Organic isocyanates containing heteroatoms may also be utilized, for example those derived from melamine. Modified polyisocyanates, such as carbodiimide or isocyanurate can also be employed. Liquid carbodiimide group- and/or isocyanurate ring-containing polyisocyanates having isocyanate contents from 15 to 33.6 percent by weight, preferably from 21 to 31 percent by weight, are also effective, for example, those based on 4,4'-, 2,4'-, and/or 2,2'-diphenylmethane diisocyanate and/or 2,4- and/or 2,6-toluene diisocyanate, and preferably 2,4- and 2,6-toluene diisocyanate and the corresponding isomer mixtures, 4,4'-, 2,4', and 2,2'-diphenylmethane diisocyanates as well as the corresponding isomer mixtures, for example, mixtures of 4,4'- and 2,4'-diphenylmethane diisocyanates, mixtures of diphenylmethane diisocyanates and polyphenyl polymethylene polyisocyanates (polymeric MDI), and mixtures of toluene diisocyanates and polymeric MDI. Preferred, however, are the aromatic diisocyanates and polyisocyanates. Particularly preferred are 2,4-, and 2,6-toluene diisocyanate and mixtures thereof (TDI), 2,4'-, 2,2'- and 4,4'-diphenylmethane diisocyanate (MDI), polymethylenepolyphenylenepolyisocyanates (polymeric MDI), and mixtures of the above preferred isocyanates.

Most particularly preferred are the polymeric MDIs.

The polyester polyols for use in producing the quasi-prepolymers can be prepared by known procedures from a polycarboxylic acid component comprising a polycarboxylic acid or acid derivative, such as an anhydride or ester of the polycarboxylic acid, and a polyol component, the polyol component comprising ethylene glycol or a mixture of ethylene glycol and at least one other glycol. The polyacid may, of course, also be used as a mixture of two or more compounds in the preparation of the polyester polyols. Particularly suitable polyester polyols for use in preparing the quasi-prepolymers and for reaction with the quasi-prepolymers in foam production are aromatic polyester polyols containing phthalic acid residues.

The production of the polyester polyols is accomplished by simply reacting the polycarboxylic acid or acid derivative with the polyol component in a known manner until the hydroxyl and acid values of the reaction mixture fall in the desired range. The reaction typically is performed at temperatures from about 150° C. to 250° C. for a period from about 1 to 10 hours. The reaction can be carried out as a batch process or continuously.

Normally, an effective amount of catalyst is added to promote the reaction. Any conventional esterification or transesterification catalyst (single compound or mixture of compounds) can be used. Suitable catalysts include organotin compounds, particularly tin compounds of carboxylic acids, such as stannous octoate, stannous oleate, stannous acetate, stannous laurate, dibutyl tin dilaurate, and other such tin salts. Additional suitable metal catalysts include tetraisopropyl titanate, and other such titanate salts, and the like.

The polycarboxylic acid component may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid;

terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid: terephthalic acid dimethyl ester and terephthalic acid-bis-glycol ester.

Polyester polyols whose acid component advantageously comprises at least about 30% by weight of phthalic acid residues are particularly useful. By phthalic acid residue is meant the group

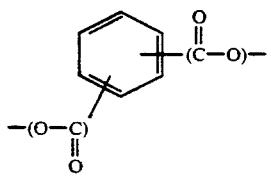

While the aromatic polyester polyols can be prepared from substantially pure reactant materials, more complex ingredients are advantageously used, such as the side-stream, waste or scrap residues from the manufacture of phthalic acid, terephthalic acid, dimethyl terephthalate, polyethylene terephthalate, and the like. Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid and (h) trimellitic anhydride, and (i) combinations thereof. These compositions may be converted by reaction with the polyols of the invention to polyester polyols through conventional transesterification or esterification procedures.

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalates, especially polyethylene terephthalate (PET), residues or scraps.

Still other preferred residues DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complete mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries sells DMT process residues under the trademark Terate®101. DMT process residues having a different composition but still containing the aromatic esters and acids are also sold by DuPont and others. The DMT process residues to be transesterified in accordance with the present invention preferably have a functionality at least slightly greater than 2.

Such suitable residues include those disclosed in U.S. Pat. Nos. 3,647,759, 4,411,949, and 4,714,717, the disclosures of which with respect to the residues are hereby incorporated by reference.

The polyester polyols used in producing the quasi-prepolymers of the invention are prepared from the above-described polycarboxylic acid components and a polyol component comprising sufficient ethylene glycol for improved foam insulation value and reduced blowing agent usage in foam production. The polyol component preferably is ethylene glycol or a mixture of ethylene glycol with at least one other glycol. The glycols are advantageously simple glycols of the general formula $C_nH_{2n}(OH)_2$ or polyglycols distinguished by intervening ether linkages in the hydrocarbon chain, as represented by the general formula $(OH)_2$. In a preferred embodiment of the invention, the other glycol is a low molecular weight aliphatic diol of the generic formula:

$$HO-R-OH$$

wherein R is a divalent radical selected from the group consisting of:
(a) alkylene radicals each containing from 3 through 6 carbon atoms, and
(b) radicals of the formula:

$$-(R^1O)_m-R^1-$$

wherein $R^1$ is an alkylene radical containing from 2 through 6 carbon atoms, and m is an integer of from 1 through 4, and
(c) mixtures thereof.

These additional glycols are included in amounts which do not detract from the enhanced insulating properties and reduced blowing agent requirement stemming from the use of ethylene glycol in preparing the polyester polyols.

The properties of the ethyleneglycol-based polyester polyol used in preparing the quasi-prepolymer fall within rather broad ranges. While the polyol may be a solid or a liquid, liquids are preferred for handling purposes. The viscosities (Brookfield) of the liquid polyols measured in cps. at 25° C. fall within a rather broad range from about 500 to about 500,000, preferably about 500 to about 100,000, and most preferably about 2,000 to about 80,000; the hydroxyl number values fall within a range of from about 115 to about 750, preferably about 150 to about 600, and most preferably from about 160 to about 450; and the acid number falls within a range of from about 0.2 to about 40 and preferably about 0.2 to about 10.

Highly preferred polyester polyols for quasi-prepolymer production are derived from the reaction of phthalic anhydride or phthalic acid with ethylene glycol, and are characterized by a free glycol content of from about 0 through 15, preferably 0 through 8, percent by weight of the polyester polyol, and a hydroxyl number within a range of from about 190 to 550.

The polyester polyols which are reacted with the isocyanate-terminated quasi-prepolymers in producing the foams of the invention ("polymeric foam-forming polyester polyols") may be prepared in conventional manner from the above described polycarboxylic acid components and any polyol component. The polyols can be aliphatic, cycloaliphatic, aromatic and/or heterocyclic. Low molecular weight aliphatic polyhydric alcohols, such as aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Moreover, the polycarboxylic acid(s) may be condensed with a mixture of polyhydric alcohols and amino alcohols.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-( 1,2,4); pentaerythritol; quinitol; mannitol; sorbitol; formitol; α-methyl-glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are alkylene glycols and oxyalkylene glycols, such as ethylene glycol, diethylene glycol, dipropylene glycol, triethyleneglycol, tripropylene glycol, tetraethylene glycol, tetrapropylene glycol, trimethylene glycol and tetramethylene glycol, and 1,4-cyclohexanedimethanol (1,4-bis-hydroxymethylcyclohexane).

These polymeric foam-forming polyester polyols advantageously have an average functionality of about 1.8 to 8, preferably about 1.8 to 5, and more preferably about 2 to 2.5. Their hydroxyl number values generally fall within a range of about 15 to 750, preferably about 30 to 550, and more preferably about 100 to 550. Such polyester polyols are commercially available. Examples are those derived from PET scrap and available under the designation Chardol 170, 336A, 560, 570, 571 and 572 from Chardonol and Freol 30-2150 from Freeman Chemical. Examples of suitable DMT derived polyester polyols are Terate® 202, 203, 204 and 254 polyols, which are available from Cape Industries. Phthalic anhydride derived-polyester polyols are commercially available under the designation Pluracol® polyol 9118 from BASF Corporation, and Stepanol PS-2002, PS-2402, PS-2502A, PS-2502, PS-2522, PS-2852, BS-2552, and PS-3152 from Stepan Company. The phthalic anhydride derived polyester polyols constitute preferred embodiments for reaction with the ethylene glycol-based quasi-prepolymers in preparing the foams of the invention.

In a preferred embodiment of the invention, polymeric foam-forming polyester polyols having a low residual free glycol content for improved foam insulation value are employed. Typically, this free glycol content is less than about 7, preferably less than about 6, and more preferably less than about 5, percent by weight of the total polyester polyol composition. When present, excess glycol can be distilled from the reaction mixture during and/or after the reaction, such as in the preparation of the low free glycol-containing polyester polyols described in U.S. patent applications Ser. Nos. 07/322,399, filed Mar. 13, 1989, and 07/342,508, filed Apr. 24, 1989, whose disclosures are hereby incorporated by reference.

The term "polyester polyol" as used in this specification and claims includes any minor amounts of unreacted polyol remaining after the preparation of the polyester polyol and/or the same or like unesterified polyol added after the preparation.

The polymer foams of the present invention can be prepared by using standard techniques known to those skilled in the art. In an advantageous embodiment of the invention, the polymeric foam-forming polyester polyols are employed in admixture with at least one other polyol in the production of the foams, especially the polyurethane foams. The polyisocyanurate and polyurethane foams may be formed simply by mixing together the quasi-prepolymer and polyester polyol, catalyst and blowing agent at temperatures ranging from about 0° C. to 150° C.

The polyisocyanurate or polyurethane foam of the invention particularly comprises the reaction product of (1) an isocyanate group-terminated quasi-prepolymer prepared by reacting (a) an organic polyisocyanate with (b) a polyester polyol comprising the reaction product of (i) a polycarboxylic acid component and (ii) ethylene glycol or a mixture of ethylene glycol with at least one other glycol, and (2) a polyol component comprising (a) a polyester polyol or (b) a mixture of a polyester polyol with at least one other polyol, in the presence of a blowing agent, a catalyst and auxiliaries and additives as required. The equivalents of ethylene glycol used in preparing the polyester polyol which is reacted with the polyisocyanate to produce above quasi-prepolymer (1) is advantageously sufficient to reduce the blowing agent requirement of the resultant foam to below the blowing agent requirement of the corresponding foam prepared from the same foam-forming composition and having the same trimer level and density except that said equivalents of ethylene glycol are replaced by an equal number of equivalents of a glycol of higher molecular weight [e.g., diethylene glycol or higher oxyalkylene glycol(s)]. The foam's trimer level or % trimer=

$$\frac{(\text{No. of equivalents of isocyanate} - \text{No. of equivalents of polyol})}{(\text{Wt. of isocyanate} + \text{Wt. of polyol})} \times 4200$$

In preferred embodiments of the invention, quasi-prepolymer (1) is prepared from an organic polyisocyanate and ethylene glycol, and polyol component (2) is a polyester polyol, preferably an aromatic polyester polyol.

The polyurethane foams can be prepared by reacting the quasi-prepolymer and polyol component on an essentially 0.9:1 to 1.25:1 equivalent basis. In the embodiment wherein the polymeric foam-forming polyester polyols are combined with another polyol(s) to produce polyurethane foams, the polyester polyols can comprise about 5 to 100, preferably about 20 to 80, and more preferably about 40 to 60, weight percent of the total polyol content in the foam preparations.

The polyisocyanurate foams of the invention are prepared by reacting the quasi-prepolymer with a minor amount of polyol, such as sufficient polyol to provide about 0.10 to 0.70 hydroxyl equivalents of polyol per equivalent of said polyisocyanate prepolymer, wherein the polymeric foam-forming polyester polyol comprises about 5 to 100, and preferably about 50 to 100, weight percent of the total polyol content in the foam preparations.

In order to ensure complete reaction in the production of the polyisocyanurate foams, the quasi-prepolymer and the polyol are generally mixed in an equivalent ratio of 1.5:1 to 12:1 and preferably 2:1 to 10:1. In ranges outside these proportions the reaction tends to yield a product having less desirable physical characteristics.

The polyols which can be employed in combination with the polymeric foam-forming polyester polyols in the preparation of the polyurethane and polyisocyanurate foam compositions include monomeric polyols and polyether polyols in general. The polyether polyols are found particularly useful in preparing rigid polyurethane foams. The polyfunctional active hydrogen initiators used in producing the polyether polyols preferably have a functionality of 2–8, and more preferably have a functionality of 3 or greater (e.g., 4–8).

Any suitable blowing agent can be employed in the foam compositions of the present invention. Water, air, nitrogen, carbon dioxide, readily volatile organic substances and/or compounds which decompose to liberate gases (e.g., azo compounds may be used). Typically, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_2H$, $CClFHCClF_2$, trifluorochloropropane, difluorodichloromethane, 1-fluoro-1,1-dichloroethane, 2,2,2-trifluoro- 1,1-dichloroethane,1,1-difluoro-1-chloroethane, chlorodifluoromethane, methylene chloride, diethylether, isopropyl ether, n-pentane, cyclopentane, 2-methylbutane, methyl formate, carbon dioxide and mixtures thereof. Trichlorofluoromethane is a preferred blowing agent.

The foams also can be produced using a froth-foaming method such as the one disclosed in U.S. Pat. No. 4,572,865. In this method, the frothing agent can be any material which is inert to the reactive ingredients and easily vaporized at atmospheric pressure. The frothing agent advantageously has an atmospheric boiling point of −50° to 10° C., and includes carbon dioxide, dichlorodifluoromethane, monochlorodifluoromethane, trifluoromethane, monochlorotrifluoromethane, monochloropentafluoroethane, vinylfluoride, vinylidenefluoride, 1,1-difluoroethane, 1,1,1-trichlorodifluoroethane, and the like. Particularly preferred are dichlorodifluoromethane and monochlorodifluoromethane. A higher boiling blowing agent is desirably used in conjunction with the frothing agent. The blowing agent is a gaseous material at the reaction temperature and advantageously has an atmospheric boiling point ranging from about 10° to 80° C. Suitable bowing agents include trichloromonofluoromethane, 1,1,2-trichloro-1,2 2-trifluoroethane, acetone, pentane, and the like, preferably trichloromonofluoromethane.

The foaming agents, e.g., trichlorofluoromethane blowing agent or combined trichlorofluoromethane blowing agent and dichlorodifluoromethane frothing agent, are employed in an amount sufficient to give the resultant foam the desired bulk density which is generally between 0.5 and 10, preferably between 1 and 5, and most preferably between 1.5 and 2.5, pounds per cubic foot. The foaming agents generally comprise from 1 to 30, and preferably comprise from 5 to 20 weight percent of the composition. When a foaming agent has a boiling point at or below ambient, it is maintained under pressure until mixed with the other components. Alternatively, it can be maintained at subambient temperatures until mixed with the other components. Mixtures of foaming agents can be employed.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carblde Corporation under the trade names "L-5420" and "L-5340", from the Dow Corning Corporation under the trade names "DC-193" and "DC-5315", and from Goldschmidt Chemical Corporation under the tradenames "B-8408" and "B-8407". Other suitable surfactants are those described in U.S. Pat. Nos. 4,365,024 and 4,529,745 and supplied by Sloss Industries Corporation under the trademarks Foamstab 100 and 200. Generally, the surfactant comprises from about 0.05 to 10, and preferably from 0.1 to 6, weight percent of the foam-forming composition.

Any of the catalysts conventionally employed in the art to catalyze the reaction of an isocyanate with an isocyanate-reactive compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, trlethylenediamine, N,N,N',N'-tetramethylethylenediamine, 1,1,3,3-tetramethylguanidine, N, N, N'N'-tetramethyl-1,3-butanediamine, N,N-dimethylethanolamine, N, N-diethylethanolamine, and the like. The catalysts generally comprise from about 0.1 to 20, and preferably from 0.3 to 10, weight percent of the total foam-forming composition.

In the preparation of the polyisocyanurate rigid foams, any catalysts known to catalyze the trimerization of isocyanates to form isocyanurates, and to catalyze the reaction of isocyanate groups with hydroxyl groups to form polyurethanes, can be employed. One preferred type of catalyst is a mixture of a tertiary amino phenol, such as 2,4,6-tris( dimethylamino methyl)phenol (sold by Air Products and Chemicals, Inc. under the designation "TMR-30"), and an alkali metal carboxylate, such as potassium-2 -ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another preferred catalyst system is a mixture comprising (i) a salt of a low molecular weight carboxylic acid selected from the group consisting of an alkali metal salt and an alkaline earth metal salt and mixtures thereof (e.g., potassium acetate), (ii) a salt of a higher molecular weight carboxylic acid selected from the group consisting of an alkali metal salt and an alkaline earth metal salt and mixtures thereof, the higher molecular weight carboxylic acid having from about 5 to 30 carbon atoms (e.g. potassium octoate), and (iii) a tertiary amine (e.g., 2,4,6-tris [dimethylaminomethyl] phenol). This mixture is described in U.S. Pat. No. 4,710,521, whose disclosure is hereby incorporated by reference.

Other additives may also be included in the foam formulations. Included are processing aids, viscosity reducers, such as 1-methyl-2-pyrrolidinone, propylene carbonate, nonreactive and reactive flame retardants, such as tris(2-chloroethyl)-phosphate, dispersing agents, plasticizers, mold release agents, antioxidants, compatibility agents and fillers and pigments. The use of such additives is well known to those skilled in the art.

The present invention also provides a process for producing a laminate which comprises (a) contacting at least one facing sheet with a foam-forming mixture comprising the quasi-prepolymer, polyol composition, blowing agent, catalyst, and auxiliaries and additives as required (e.g., a surfactant) and (b) foaming the foam-forming mixture. The process is advantageously conducted in a continuous manner by depositing the foam-forming mixture on a facing sheet being conveyed along a production line, and preferably placing another facing sheet on the deposited mixture. The foam-forming mixture is conveniently thermally cured at a temperature from about 20° C. to 150° C. in a suitable apparatus, such as an oven or heated mold.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following examples in which all parts and percentages are by weight unless otherwise indicated.

EXAMPLE 1

This example illustrates the preparation of polyester polyol mixtures having different free glycol contents.

A. Preparation of Polyester Polyol from Phthalic Anhydride and Ethylene Glycol A dry reaction vessel equipped with an agitator, thermometer and inlet and outlet for nitrogen gas was charged with 18,591 g of phthalic anhydride, 19,481 g of ethylene glycol (EG), and 42.8 g of tetraisopropyl titanate. The reaction, which was conducted under a nitrogen blanket, was first run for 3 hours, with a gradual increase of temperature to 200° C. and the removal of distillate. The ingredients were then heated at 200° C. for an additional 3 hours, and cooled down. The resultant polyol mixture was filtered and distilled to yield a product (Polyol No. 1) having a free EG content of 0.3%, an equivalent weight of 186.8, and a viscosity of 31,600 cps at 25° C.

Additional EG was blended with Polyol No. 1 to give the two following polyol mixtures:

| POLYOL NO. | % EG | EQ. WT | VISCOSITY (cps) |
|---|---|---|---|
| 2 | 8.2 | 133 | 5,600 |
| 3 | 14.6 | 110 | 2,550 |

B. Preparation of Polyester Polyol from Phthalic Anhydride and Diethylene Glycol The esterification and distillation procedure of Example 1A was repeated except that 1,254 g of phthalic anhydride, 2,246 g of diethylene glycol (DEG), and 4.0 g of tetraisopropyl titanate were used. Distillation yielded a product (Polyol No. 4) having a free DEG content of <0.1%, an equivalent weight of 252.7, and a viscosity of 10,100 cps at 25° C.

Additional DEG was blended with Polyol No. 4 to give the two following polyol mixtures:

| POLYOL NO. | % DEG | EQ. WT. | VISCOSITY (cps) |
|---|---|---|---|
| 5 | 8.2 | 195.8 | 4,250 |
| 6 | 14.5 | 166.1 | 2,325 |

EXAMPLE 2

This example illustrates the preparation of polyisocyanate prepolymers from both EG- and DEG-based polyester polyols having different free glycol contents.

The preparation of inventive Prepolymers Nos. 1-3 and comparative Prepolymers Nos. 4-6 of Table I below was conducted by reacting the listed quantities of the ingredients in a dry reaction vessel equipped with an agitator, thermometer, addition funnel and inlet and outlet for nitrogen gas. The reaction was conducted under a nitrogen blanket. The isocyanate was first charged to the vessel and heated to 90±2° C. The polyester polyol was added at a constant rate over a period of 90 to 120 minutes, maintaining the temperature at 90±2° C. After the polyol addition was completed, the reaction was continued at 90±2° C. for an additional 90 minutes to produce the polyisocyanate prepolymer. Properties of the prepolymers produced are shown in Table I.

TABLE I

| PREPOLYMER NO. | REACTANT CHARGE | | | PREPOLYMER PROPERTIES | | |
|---|---|---|---|---|---|---|
| | ISOCYANATE[1] PTS. BY WT. | POLYOL NO. | PTS. BY WT. | % NCO | EQ. WT. | BROOKFIELD VISCOSITY (cps) |
| 1 | 90.70 | 1[2] | 9.30 | 26.56 | 158.1 | 5,950 |

TABLE I-continued

| PREPOLYMER NO. | REACTANT CHARGE | | | PREPOLYMER PROPERTIES | | |
|---|---|---|---|---|---|---|
| | ISOCYANATE[1] PTS. BY WT. | POLYOL NO. | PTS. BY WT. | % NCO | EQ. WT. | BROOKFIELD VISCOSITY (cps) |
| 2 | 91.78 | 2[2] | 8.22 | 25.84 | 162.5 | 10,600 |
| 3 | 92.60 | 3[2] | 7.40 | 26.50 | 158.5 | 12,500 |
| 4 | 89.26 | 4[3] | 10.74 | 26.16 | 160.6 | 4,100 |
| 5 | 90.24 | 5[3] | 9.76 | 26.35 | 159.4 | 4,900 |
| 6 | 90.88 | 6[3] | 9.12 | 26.20 | 160.3 | 5,800 |

[1]Isocyanate = polymethylene polyphenyl isocyanate having an equivalent weight of 133 and a viscosity of 150–250 cps at 25° C., and is available from the Mobay Chemical Company, Pittsburgh, Pa. under the trade name MONDUR MR.
[2]Of Example 1A.
[3]Of Example 1B.

EXAMPLE 3

This example illustrates the synthesis of polyisocyanurate foams (10% trimer) from polyisocyanate prepolymers and polyester polyols.

In each foam preparation, the quantities of ingredients listed below in each of Tables II–IV were added to a vessel. First, the A-component (a mixture of the isocyanate, blowing agent and surfactant) was blended in the vessel and cooled to 15.6° C. The B-component (polyester polyol) at 25° C. was then added to the vessel, and all ingredients were mixed at 3600 rpm for 10 seconds. The C-component (catalyst) at 25° C. was next mixed into the contents of the vessel over a 2-second interval.

All ingredients were thereafter mixed at 3600 rpm for an additional 10 seconds and then poured into a box, yielding a rigid polyisocyanurate foam.

Characteristics of the foams produced are shown in the following Tables II to IV. The data shown in these tables demonstrate that foams having low thermal conductivity can be prepared from both the inventive EG-based isocyanate prepolymers (Foams A to C) and the comparative DEG-based isocyanate prepolymers (Foams D to F). Furthermore, a comparison of these inventive and comparative foams with respect to their blowing agent usage and density shown in Tables II–IV reveals that the inventive foams require significantly less blowing agent to achieve the same density. Similarly, the inventive foams require less blowing agent than the control Foam G made with a conventional polymeric MDI. Accordingly, use of the EG-based prepolymers in place of the DEG-based prepolymers leads to a reduction in both foam cost and blowing agent requirement.

TABLE II

PREPARATION OF 10% TRIMER FOAMS
(B-Component Polyol = PS-3152C)

| INGREDIENTS | FOAM | | | | | | |
|---|---|---|---|---|---|---|---|
| | A | B | C | D | E | F | G |
| A-Component | | | | | | | |
| Prepolymer No. 1[1] | 404.5 | — | — | — | — | — | — |
| Prepolymer No. 2[1] | — | 401.0 | — | — | — | — | — |
| Prepolymer No. 3[1] | — | — | 405.1 | — | — | — | — |
| Prepolymer No. 4[1] | — | — | — | 408.0 | — | — | — |
| Prepolymer No. 5[1] | — | — | — | — | 406.0 | — | — |
| Prepolymer No. 6[1] | — | — | — | — | — | 406.9 | — |
| Mondur MR-200[2] | — | — | — | — | — | — | 380.0 |
| Trichlorofluoromethane | 84.9 | 79.6 | 74.3 | 88.1 | 84.8 | 84.1 | 85.3 |
| Surfactant[3] | 4.0 | 4.0 | 4.0 | 4.0 | 4.0 | 4.0 | 4.0 |
| B-Component | | | | | | | |
| Polyol PS-3152C[4] | 195.4 | 190.0 | 194.9 | 192.0 | 194.0 | 193.1 | 220.0 |
| C-Component | | | | | | | |
| Catalyst[5] | 20.0 | 20.0 | 20.0 | 20.0 | 20.0 | 20.0 | 21.3 |
| FOAM PROPERTIES | | | | | | | |
| Reactivity, sec (Cream/Firm) | 16/32 | 14/28 | 15/30 | 17/31 | 17/33 | 16/30 | 19/30 |
| Density, lb/ft$^3$ | 1.75 | 1.68 | 1.79 | 1.79 | 1.86 | 1.86 | 1.80 |
| % Closed Cells | 88.2 | 88.4 | 86.6 | 87.3 | 90.9 | 87.3 | 87.7 |
| k-factor Aging 1" Thick Core Samples (Btu-in/hr-ft$^2$ - °F.) | | | | | | | |
| Initial | .119 | .118 | .114 | .116 | .112 | .114 | .119 |
| 30 days | .126 | .131 | .142 | .128 | .127 | .127 | .129 |
| 60 days | .131 | .136 | .145 | .130 | .133 | .128 | .136 |
| 90 days | .134 | .138 | .149 | .136 | .134 | .130 | .140 |
| Δk-factor, 90 days | .015 | .020 | .035 | .020 | .022 | .016 | .021 |

[1]Of Example 2.
[2]Mondur MR-200 = polymethylene polyphenyl isocyanate having an equivalent weight of 138, and a viscosity of ≈1800 cps at 25° C. (Mobay Chemical Company).
[3]Surfactant = Y-10222 (Union Carbide Corporation).
[4]Polyol PS-3152C = reaction product of phthalic anhydride and diethylene glycol (DEG) having a hydroxyl number of 320, a viscosity at 25° C. of 2,500 cps and 15% free DEG (Stephan Company).
[5]Catalyst = mixture employed in the form of a solution in DEG in a weight ratio of 1.18 potassium acetate:1.62 potassium octoate:0.69 DMP-30:6.51 DEG.

TABLE III

PREPARATION OF 10% TRIMER FOAMS
(B-Component Polyol = Chardol 170)

| INGREDIENTS | FOAM A | B | C | D | E | F | G |
|---|---|---|---|---|---|---|---|
| A-Component | | | | | | | |
| Prepolymer No. 1[1] | 376.0 | — | — | — | — | — | — |
| Prepolymer No. 2[1] | — | 382.0 | — | — | — | — | — |
| Prepolymer No. 3[1] | — | — | 377.1 | — | — | — | — |
| Prepolymer No. 4[1] | — | — | — | 380.0 | — | — | — |
| Prepolymer No. 5[1] | — | — | — | — | 378.0 | — | — |
| Prepolymer No. 6[1] | — | — | — | — | — | 378.9 | — |
| Mondur MR-200[2] | — | — | — | — | — | — | 346.0 |
| Trichlorofluoromethane | 88.8 | 85.1 | 82.5 | 93.2 | 89.1 | 87.5 | 91.7 |
| Surfactant[3] | 4.0 | 4.0 | 4.0 | 4.0 | 4.0 | 4.0 | 4.0 |
| B-Component | | | | | | | |
| Polyol Chardol 170[4] | 224.0 | 218.0 | 222.9 | 220.0 | 222.0 | 221.1 | 254.0 |
| C-Component | | | | | | | |
| Catalyst[5] | 20.0 | 20.0 | 20.0 | 20.0 | 20.0 | 20.0 | 17.9 |
| FOAM PROPERTIES | | | | | | | |
| Reactivity, sec (Cream/Firm) | 11/21 | 11/22 | 10/19 | 11/21 | 11/19 | 11/20 | 11/23 |
| Density, lb/ft$^3$ | 1.82 | 1.77 | 1.85 | 1.74 | 1.78 | 1.80 | 1.80 |
| % Closed Cells | 89.6 | 90.6 | 89.3 | 87.1 | 91.0 | 87.6 | 90.6 |
| k-factor Aging 1" Thick Core Samples (Btu-in/hr-ft$^2$ - °F.) | | | | | | | |
| Initial | .110 | .112 | .108 | .115 | .118 | .112 | .122 |
| 30 days | .128 | .123 | .128 | .134 | .134 | .132 | .136 |
| 60 days | .136 | .132 | .132 | .142 | .147 | .137 | .144 |
| 90 days | .138 | .136 | .136 | .146 | .151 | .142 | .146 |
| Δk-factor, 90 days | .028 | .024 | .028 | .031 | .033 | .030 | .024 |

[1] Of Example 2.
[2] Of Example 3, Table II.
[3] Of Example 3, Table II.
[4] Polyol Chardol 170 = PET-based polyester polyol having a hydroxyl number of 224–244 and a viscosity at 25° C. of 2,500–3,100 cps (Chardonol).
[5] Of Example 3, Table II.

TABLE IV

PREPARATION OF 10% TRIMER FOAMS
(B-Component Polyol = PS-2002A)

| INGREDIENTS | FOAM A | B | C | D | E | F | G |
|---|---|---|---|---|---|---|---|
| A-Component | | | | | | | |
| Prepolymer No. 1[1] | 361.1 | — | — | — | — | — | — |
| Prepolymer No. 2[1] | — | 366.9 | — | — | — | — | — |
| Prepolymer No. 3[1] | — | — | 361.5 | — | — | — | — |
| Prepolymer No. 4[1] | — | — | — | 364.5 | — | — | — |
| Prepolymer No. 5[1] | — | — | — | — | 362.9 | — | — |
| Prepolymer No. 6[1] | — | — | — | — | — | 364.0 | — |
| Mondur MR-200[2] | — | — | — | — | — | — | 330.0 |
| Trichlorofluoromethane | 95.5 | 89.3 | 86.9 | 99.3 | 95.9 | 94.5 | 100.0 |
| Surfactant[3] | 4.0 | 4.0 | 4.0 | 4.0 | 4.0 | 4.0 | 4.0 |
| B-Component | | | | | | | |
| Polyol PS-2002A[4] | 238.9 | 233.1 | 238.5 | 235.5 | 237.1 | 236.0 | 270.0 |
| C-Component | | | | | | | |
| Catalyst[5] | 20.0 | 20.0 | 20.0 | 20.0 | 20.0 | 20.0 | 20.0 |
| FOAM PROPERTIES | | | | | | | |
| Reactivity, sec (Cream/Firm) | 13/32 | 12/28 | 11/25 | 15/34 | 15/34 | 13/33 | 21/39 |
| Density, lb/ft$^3$ | 1.80 | 1.76 | 1.87 | 1.78 | 1.78 | 1.82 | 1.80 |
| % Closed Cells | 89.7 | 89.3 | 89.6 | 88.9 | 94.2 | 89.3 | 88.6 |
| k-factor Aging 1" Thick Core Samples (Btu-in/hr-ft$^2$ - °F.) | | | | | | | |
| Initial | .107 | .106 | .104 | .106 | .104 | .104 | .119 |
| 30 days | .114 | .116 | .116 | .119 | .116 | .116 | .127 |
| 60 days | .120 | .120 | .116 | .124 | .122 | .117 | .132 |
| 90 days | .122 | .118 | .116 | .124 | .123 | .117 | .138 |
| Δk-factor, 90 days | .015 | .012 | .012 | .018 | .019 | .013 | .019 |

[1] Of Example 2.
[2] Of Example 3, Table II.
[3] Of Example 3, Table II.
[4] Polyol PS-2002A = reaction product of phthalic anhydride and DEG having a hydroxyl number of 200, a viscosity at 25° C. of 9,120 cps and 4% free DEG (Stepan Company).
[5] Of Example 3, Table II.

EXAMPLE 4

This example illustrates the synthesis of further polyisocyanurate foams (18% trimer) from polyisocyanate prepolymers and polyester polyols.

The foams were prepared according to the procedure of Example 3 utilizing the ingredients and quantities thereof presented in each of Tables V–VII below.

Characteristics of the foams produced are shown in Tables V to VII. The data shown in these tables reveals that use of EG-based isocyanate prepolymers leads to the production of superior insulating foams (Foams A to C) which are characterized by a blowing agent requirement which is significantly lower than that of Foams D to F made with the DEG-based isocyanate prepolymers and of Foam G made with a conventional polymeric MDI.

TABLE V

PREPARATION OF 18% TRIMER FOAMS
(B-Component Polyol = PS-3152C)

| INGREDIENTS | FOAM | | | | | | |
|---|---|---|---|---|---|---|---|
| | A | B | C | D | E | F | G |
| A-Component | | | | | | | |
| Prepolymer No. 1[1] | 498.9 | — | — | — | — | — | — |
| Prepolymer No. 2[1] | — | 506.0 | — | — | — | — | — |
| Prepolymer No. 3[1] | — | — | 499.6 | — | — | — | — |
| Prepolymer No. 4[1] | — | — | — | 502.9 | — | — | — |
| Prepolymer No. 5[1] | — | — | — | — | 501.1 | — | — |
| Prepolymer No. 6[1] | — | — | — | — | — | 502.5 | — |
| Mondur MR-200[2] | — | — | — | — | — | — | 464.0 |
| Trichlorofluoromethane | 89.9 | 96.8 | 99.6 | 101.3 | 103.1 | 106.4 | 109.2 |
| Surfactant[3] | 4.0 | 4.0 | 4.0 | 4.0 | 4.0 | 4.0 | 4.0 |
| B-Component | | | | | | | |
| Polyol PS-3152C[4] | 101.0 | 94.0 | 100.4 | 97.1 | 98.9 | 97.5 | 136.0 |
| C-Component | | | | | | | |
| Catalyst[5] | 20.0 | 20.0 | 20.0 | 20.0 | 20.0 | 20.0 | 20.0 |
| FOAM PROPERTIES | | | | | | | |
| Reactivity, sec (Cream/Firm) | 14/34 | 13/34 | 13/34 | 14/38 | 15/39 | 14/40 | 24/41 |
| Density, lb/ft$^3$ | 1.76 | 1.76 | 1.72 | 1.78 | 1.84 | 1.80 | 1.79 |
| % Closed Cells | 89.5 | 90.0 | 89.9 | 89.7 | 94.8 | 90.9 | 89.4 |
| k-factor Aging 1" Thick Core Samples (Btu-in/hr-ft$^2$ - °F.) | | | | | | | |
| Initial | .117 | .117 | .114 | .110 | .108 | .110 | .116 |
| 30 days | .134 | .130 | .126 | .129 | .129 | .131 | .139 |
| 60 days | .142 | .139 | .136 | .137 | .138 | .136 | .147 |
| 90 days | .144 | .142 | .136 | .140 | .138 | .140 | .149 |
| Δk-factor, 90 days | .027 | .025 | .022 | .030 | .030 | .030 | .033 |

[1]Of Example 2.
[2]Of Example 3, Table II.
[3]Of Example 3, Table II.
[4]Of Example 3, Table II.
[5]Of Example 3, Table II.

TABLE VI

PREPARATION OF 18% TRIMER FOAMS
(B-Component Polyol = Chardol 170)

| INGREDIENTS | FOAM | | | | | | |
|---|---|---|---|---|---|---|---|
| | A | B | C | D | E | F | G |
| A-Component | | | | | | | |
| Prepolymer No. 1[1] | 484.0 | — | — | — | — | — | — |
| Prepolymer No. 2[1] | — | 492.0 | — | — | — | — | — |
| Prepolymer No. 3[1] | — | — | 485.1 | — | — | — | — |
| Prepolymer No. 4[1] | — | — | — | 486.7 | — | — | — |
| Prepolymer No. 5[1] | — | — | — | — | 486.7 | — | — |
| Prepolymer No. 6[1] | — | — | — | — | — | 488.0 | — |
| Mondur MR-200[2] | — | — | — | — | — | — | 445.3 |
| Trichlorofluoromethane | 99.5 | 102.4 | 107.1 | 106.1 | 112.4 | 114.8 | 113.9 |
| Surfactant[3] | 4.0 | 4.0 | 4.0 | 4.0 | 4.0 | 4.0 | 4.0 |
| B-Component | | | | | | | |
| Polyol Chardol 170[4] | 116.0 | 108.0 | 114.9 | 110.9 | 113.3 | 114.8 | 154.7 |
| C-Component | | | | | | | |
| Catalyst[5] | 20.0 | 20.0 | 20.0 | 20.0 | 20.0 | 20.0 | 20.0 |
| FOAM PROPERTIES | | | | | | | |
| Reactivity, sec (Cream/Firm) | 11/27 | 11/32 | 10/28 | 10/29 | 11/29 | 11/34 | 11/24 |
| Density, lb/ft$^3$ | 1.82 | 1.79 | 1.80 | 1.84 | 1.81 | 1.76 | 1.78 |
| % Closed Cells | 90.0 | 89.5 | 90.5 | 90.2 | 95.4 | 91.7 | 90.2 |
| k-factor Aging 1" Thick Core Samples (Btu-in/hr-ft$^2$ - °F.) | | | | | | | |
| Initial | .113 | .112 | .110 | .114 | .112 | .112 | .114 |
| 30 days | .136 | .132 | .130 | .135 | .136 | .138 | .143 |

TABLE VI-continued

PREPARATION OF 18% TRIMER FOAMS
(B-Component Polyol = Chardol 170)

| INGREDIENTS | FOAM | | | | | | |
|---|---|---|---|---|---|---|---|
| | A | B | C | D | E | F | G |
| 60 days | .142 | .140 | .138 | .141 | .146 | .143 | .149 |
| 90 days | .146 | .140 | .139 | .146 | .148 | .146 | .157 |
| Δk-factor, 90 days | .033 | .028 | .029 | .032 | .036 | .034 | .043 |

[1] Of Example 2.
[2] Of Example 3, Table II.
[3] Of Example 3, Table II.
[4] Of Example 3, Table III.
[5] Of Example 3, Table II.

TABLE VII

PREPARATION OF 18% TRIMER FOAMS
(B-Component Polyol = PS-2002A)

| INGREDIENTS | FOAM | | | | | | |
|---|---|---|---|---|---|---|---|
| | A | B | C | D | E | F | G |
| A-Component | | | | | | | |
| Prepolymer No. 1[1] | 476.0 | — | — | — | — | — | — |
| Prepolymer No. 2[1] | — | 485.1 | — | — | — | — | — |
| Prepolymer No. 3[1] | — | — | 477.1 | — | — | — | — |
| Prepolymer No. 4[1] | — | — | — | 481.1 | — | — | — |
| Prepolymer No. 5[1] | — | — | — | — | 478.9 | — | — |
| Prepolymer No. 6[1] | — | — | — | — | — | 480.5 | — |
| Mondur MR-200[2] | — | — | — | — | — | — | 436.0 |
| Trichlorofluoromethane | 104.5 | 106.9 | 109.7 | 111.5 | 113.7 | 116.4 | 116.9 |
| Surfactant[3] | 4.0 | 4.0 | 4.0 | 4.0 | 4.0 | 4.0 | 4.0 |
| B-Component | | | | | | | |
| Polyol PS-2002A[4] | 124.0 | 114.9 | 122.9 | 118.9 | 121.1 | 119.5 | 164.0 |
| C-Component | | | | | | | |
| Catalyst[5] | 20.0 | 20.0 | 20.0 | 20.0 | 20.0 | 20.0 | 20.0 |
| FOAM PROPERTIES | | | | | | | |
| Reactivity, sec (Cream/Firm) | 13/43 | 12/42 | 12/44 | 13/44 | 14/48 | 13/50 | 17/44 |
| Density, lb/ft$^3$ | 1.78 | 1.80 | 1.82 | 1.81 | 1.81 | 1.77 | 1.79 |
| % Closed Cells | 89.7 | 89.9 | 90.4 | 89.9 | 96.2 | 90.2 | 89.4 |
| k-factor Aging 1" Thick Core Samples (Btu-in/hr-ft$^2$ - °F.) | | | | | | | |
| Initial | .112 | .112 | .109 | .112 | .108 | .112 | .114 |
| 30 days | .128 | .128 | .129 | .132 | .128 | .130 | .134 |
| 60 days | .134 | .134 | .135 | .134 | .136 | .134 | .142 |
| 90 days | .138 | .134 | .138 | .140 | .136 | .136 | .145 |
| Δk-factor, 90 days | .026 | .022 | .029 | .028 | .028 | .034 | .031 |

[1] Of Example 2.
[2] Of Example 3, Table II.
[3] Of Example 3, Table II.
[4] Of Example 3, Table IV.
[5] Of Example 3, Table II.

EXAMPLE 5

This example illustrates the preparation of polyester polyol mixtures by transesterifying dimethyl terephthalate (DMT) process residues with either ethylene glycol (EG) or diethylene glycol (DEG).

A. Transesterification with EG

A dry reaction vessel equipped with an agitator, thermometer and inlet and outlet for nitrogen gas was charged with 1794 g of ISOMERS[1], 598 g of Terate ® 101[2], 18.6 g of EG, and 5 ml of tetraisopropyl titanate. The ingredients first were heated to 200° C. with the removal of distillate (744 g), and then held at 200° C. for two hours, and cooled down. The resultant polyol mixture was filtered and vacuum stripped on a wiped film still to yield a product (Polyol No. 7) having a free glycol content of 1.0%, an equivalent weight of 192.2, and a viscosity of >200,000 cps at 25° C.

B. Transesterification with DEG

A dry reaction vessel equipped with an agitator, thermometer and inlet and outlet for nitrogen gas was charged with 1370 g of ISOMERS[1], 456 g of Terate ® 101[2], 2424 g of DEG, and 5.7 ml of tetraisopropyl titanate. The ingredients first were heated to 225° C. with the removal of distillate (553 g), and then held at 225° C. for two hours, and cooled down. The resultant polyol mixture was filtered and vacuum stripped on a wiped film still to yield a product (Polyol No. 8) having a free glycol content of 2.0%, an equivalent weight of 263.8, and a viscosity of >200,000 cps at 25° C.

1. ISOMERS=DMT isomeric by-product having the composition shown in U.S. Pat. No. 4,652,591.
2. Terate ® 101=DMT process residue having acid number of 23.8 and saponification number of 535 (Cape Industries).

EXAMPLE 6

This example illustrates the preparation of polyisocyanate prepolymers from polyester polyols made from DMT process residues and either EG or DEG.

The preparation of inventive Prepolymers Nos. 7 and 9 and comparative Prepolymers Nos. 8 and 10 of Table VIII below was conducted according to the procedure of Example 2 from the ingredients and quantities thereof shown in Table VIII. Characteristics of the prepolymers produced are shown in the table.

TABLE VIII

| PREPOLYMER NO. | REACTANT CHARGE | | | PREPOLYMER PROPERTIES | | |
|---|---|---|---|---|---|---|
| | ISOCYANATE[1] PTS. BY WT. | POLYOL[2] NO. | PTS. BY WT. | % NCO | EQ. WT. | BROOKFIELD VISCOSITY (cps) |
| 7 | 87.14 | 7 | 12.86 | 24.83 | 169.2 | 74,000 |
| 8 | 85.52 | 8 | 14.48 | 24.36 | 172.4 | 21,250 |
| 9 | 91.62 | 7 | 8.38 | 25.82 | 162.7 | 5,600 |
| 10 | 88.79 | 8 | 11.21 | 25.33 | 165.8 | 6,100 |

[1]Of Example 2.
[2]Of Example 5.

EXAMPLE 7

This example illustrates the synthesis of polyisocyanate foams (10% and 18% trimer) from (a)polyisocyanate prepolymers derived from DMT process residues and (b)polyester polyols.

The foams were prepared according to the procedure of Example 3 from the ingredients and quantities thereof shown in the following Table IX. Characteristics of the foams produced are shown in the table. The data shown in this table demonstrate that the inventive foams made with the EG-based isocyanate prepolymers (Foams A, D and G) are highly insulating and can be prepared at a lower blowing agent usage than the comparative foams.

TABLE IX

PREPARATION OF POLYISOCYANURATE FOAMS

| INGREDIENTS | 10% TRIMER FOAMS | | | | | | 18% TRIMER FOAMS | | |
|---|---|---|---|---|---|---|---|---|---|
| | A | B | C | D | E | F | G | H | I |
| A-Component | | | | | | | | | |
| Prepolymer No. 7[1] | 207.8 | — | — | 188.2 | — | — | — | — | — |
| Prepolymer No. 8[1] | — | 210.8 | — | — | 190.5 | — | — | — | — |
| Prepolymer No. 9[1] | — | — | — | — | — | — | 252.8 | — | — |
| Prepolymer No. 10[1] | — | — | — | — | — | — | — | 255.0 | — |
| Mondur MR-200[2] | — | — | — | — | — | 165.0 | — | — | — |
| Code 047[3] | — | — | 189.8 | — | — | — | — | — | 231.8 |
| Trichlorofluoromethane | 39.0 | 42.2 | 48.6 | 43.6 | 46.6 | 52.7 | 51.3 | 53.0 | 54.6 |
| Surfactant[4] | 2.0 | 2.0 | 2.0 | 2.0 | 2.0 | 2.0 | 2.0 | 2.0 | 2.0 |
| B-Component | | | | | | | | | |
| Polyol PS-3152C[5] | 92.2 | 89.2 | 110.2 | — | — | — | 47.2 | 45.0 | 68.2 |
| Polyol PS-2002C[6] | — | — | — | 111.8 | 109.5 | 135.0 | — | — | — |
| C-Component | | | | | | | | | |
| Catalyst[7] | 10.0 | 10.0 | 10.0 | 10.0 | 10.0 | 10.0 | 10.0 | 10.0 | 10.0 |
| FOAM PROPERTIES | | | | | | | | | |
| Reactivity, sec (Cream/Firm) | | | | | | | | | |
| Density, lb/ft$^3$ | 1.65 | 1.64 | 1.70 | 1.74 | 1.76 | 1.73 | 1.73 | 1.86 | 1.74 |
| % Closed Cells | 88.4 | 86.4 | 87.4 | 89.5 | 88.6 | 87.7 | 89.2 | 90.1 | 89.2 |
| k-factor Aging 1" Thick Core Samples (Btu-in/hr-ft$^2$ - °F.) | | | | | | | | | |
| Initial | .120 | .117 | .122 | .110 | .107 | .112 | .117 | .116 | .118 |
| 30 days | .131 | .126 | .137 | .120 | .115 | .128 | .136 | .134 | .138 |
| 60 days | .136 | .130 | .144 | .124 | .119 | .132 | .139 | .139 | .146 |
| 90 days | .132 | .135 | .148 | .128 | .124 | .136 | .149 | .141 | .151 |
| Δk-factor, 90 days | .012 | .018 | .026 | .018 | .017 | .024 | .032 | .025 | .033 |

[1]Of Example 6.
[2]Of Example 3.
[3]Code 047 = polymethylene polyphenyl isocyanate having an equivalent weight of 138, and a viscosity of ≈1800 cps at 25° C. (The Dow Chemical Company).
[4]Of Example 3.
[5]Of Example 3, Table II.
[6]Of Example 3, Table IV.
[7]Of Example 3.

EXAMPLE 8

This example illustrates the preparation of polyester polyol mixtures by transesterifying scrap polyethylene terephthalate (PET) with (a)phthalic anhydride (PA) and (b)either ethylene glycol (EG) or diethylene glycol (DEG).

A. Transesterification with PA and EG

A dry reaction vessel equipped with an agitator, a thermometer and an inlet and outlet for nitrogen gas was charged with 1690 g of scrap PET, 559 g of PA, 1951 g of EG and 5.7 ml of tetraisopropyl titanate. The ingredients first were heated to 210° C. with the removal of distillate (116 g), and then held at 210° C. for two hours and cooled down. The resultant polyol mixture was filtered and vacuum stripped on a wiped film still to yield a solid product (Polyol No. 9) having a free glycol content of 2.9% and an equivalent weight of 156.7.

B. Transesterification with PA and DEG

A dry reaction vessel equipped with an agitator, thermometer and inlet and outlet for nitrogen gas was charged with 1271 g of scrap PET, 420 g of PA, 2509 g of DEG and 5.7 ml of tetraisopropyl titanate. The ingredients first were heated to 225° C. with the removal of distillate {69 g), and then held at 225.C for two hours and cooled down. The resultant polyol mixture was filtered and vacuum stripped on a wiped film still to yield a product (Polyol No. 10) having a free glycol content of 0.3%, an equivalent weight of 222.0, and a viscosity of 10,700 cps at 25° C.

EXAMPLE 10

This example illustrates the synthesis of polyisocyanurate foams (10% and 18% trimer) from (a) polyisocyanate prepolymers derived from PET and (b) polyester polyols.

The foams were prepared according to the procedure of Example 3 from the ingredients and quantities thereof shown in the following Table XI. Characteristics of the foams produced are shown in the table. The data shown in this table demonstrate that use of the EG-based isocyanate prepolymer as a reactive component leads to the production of superior insulating foams (Foams A, D, G, and J) and a reduction in the amount of blowing agent and cost involved in the manufacture.

TABLE XI

| | PREPARATION OF POLYISOCYANURATE FOAMS | | | | | | | | | | | |
|---|---|---|---|---|---|---|---|---|---|---|---|---|
| | 10% TRIMER FOAMS | | | | | | 18% TRIMER FOAMS | | | | | |
| INGREDIENTS | A | B | C | D | E | F | G | H | I | J | K | L |
| A-Component | | | | | | | | | | | | |
| Prepolymer No. 11[1] | 204.8 | — | — | 184.5 | — | — | 253.5 | — | — | 243.8 | — | — |
| Prepolymer No. 12[1] | — | 210.0 | — | — | 190.5 | — | — | 260.2 | — | — | 251.2 | — |
| Mondur MR-200[2] | — | — | — | — | — | 165.0 | — | — | — | — | — | 218.0 |
| Code 047[3] | — | — | 189.8 | — | — | — | — | — | 231.8 | — | — | — |
| Trichlorofluoromethane | 37.6 | 40.4 | 48.6 | 43.8 | 44.7 | 52.7 | 50.2 | 52.9 | 58.8 | 54.4 | 57.8 | 58.5 |
| Surfactant[4] | 2.0 | 2.0 | 2.0 | 2.0 | 2.0 | 2.0 | 2.0 | 2.0 | 2.0 | 2.0 | 2.0 | 2.0 |
| B-Component | | | | | | | | | | | | |
| Polyol PS-3152C[5] | 95.2 | 90.0 | 110.2 | — | — | — | 46.5 | 39.8 | 68.2 | — | — | — |
| Polyol PS-2002A[6] | — | — | — | 115.5 | 109.5 | 135.0 | — | — | — | 56.2 | 48.8 | 82.0 |
| C-Component | | | | | | | | | | | | |
| Catalyst[7] | 10.0 | 10.0 | 10.0 | 10.0 | 10.0 | 10.0 | 10.0 | 10.0 | 10.0 | 10.0 | 10.0 | 10.0 |
| FOAM PROPERTIES | | | | | | | | | | | | |
| Reactivity, sec (Cream/Firm) | | | | | | | | | | | | |
| Density, lb/ft$^3$ | 1.72 | 1.71 | 1.70 | 1.71 | 1.78 | 1.73 | 1.77 | 1.82 | 1.72 | 1.80 | 1.78 | 1.79 |
| % Closed Cells | 84.6 | 85.5 | 83.2 | 89.8 | 88.8 | 87.7 | 89.4 | 89.2 | 88.4 | 89.5 | 89.7 | 89.4 |
| k-factor Aging 1" Thick Core Samples (Btu-in/hr-ft$^2$ - °F.) | | | | | | | | | | | | |
| Initial | .123 | .122 | .123 | .114 | .108 | .112 | .120 | .114 | .123 | .116 | .112 | .114 |
| 30 days | .134 | .128 | .134 | .120 | .114 | .128 | .134 | .132 | .140 | .128 | .128 | .134 |
| 60 days | .141 | .133 | .143 | .122 | .118 | .132 | .141 | .138 | .148 | .135 | .136 | .142 |
| 90 days | .147 | .136 | .146 | .126 | .120 | .136 | .144 | .143 | .156 | .139 | .140 | .145 |
| Δk-factor, 90 days | .024 | .014 | .023 | .012 | .012 | .024 | .024 | .029 | .033 | .023 | .028 | .031 |

[1]Of Example 9.
[2]Of Example 3.
[3]Of Example 7.
[4]Of Example 3.
[5]Of Example 3, Table II.
[6]Of Example 3, Table IV.
[7]Of Example 3.

EXAMPLE 9

This example illustrates the preparation of polyisocyanate prepolymers from polyester polyols made from PET, PA and either EG or DEG.

The preparation of inventive Prepolymer No. 11 and comparative Prepolymer No. 12 of Table X below was conducted according to the procedure of Example 2 from the ingredients and quantities thereof shown in Table X. Characteristics of the prepolymers produced are shown in the table.

We claim:

1. A polyisocyanurate foam comprising the reaction product in the presence of a blowing agent and catalyst of:
   (1) an isocyanate group-terminated quasi-prepolymer prepared by reacting
   (a) an organic polyisocyanate and
   (b) a polyester polyol comprising the reaction product of (i) a polycarboxylic acid component and (ii)

TABLE X

| | REACTANT CHARGE | | | PREPOLYMER PROPERTIES | | |
|---|---|---|---|---|---|---|
| PREPOLYMER | ISOCYANATE[1] | POLYOL[2] | | | | BROOKFIELD |
| NO. | PTS. BY WT. | NO. | PTS. BY WT. | % NCO | EQ. WT. | VISCOSITY (cps) |
| 11 | 90.88 | 9 | 9.12 | 25.61 | 164.0 | 14,000 |
| 12 | 86.38 | 10 | 13.62 | 24.35 | 172.5 | 22,250 |

[1]Of Example 2.
[2]Of Example 8.

ethylene glycol or the mixture of ethylene glycol and at least one other glycol of the formula:

HO—R—OH wherein R is an alkylene radical containing from 3 through 6 carbon atoms, the equivalents of ethylene glycol in the mixture with at least one other glycol being sufficient to reduce the blowing agent requirement of the resultant foam to below the blowing agent requirement of the corresponding foam prepared from the same foam-forming composition and having the same trimer level and density except that said equivalents of ethylene glycol in the mixture are replaced by an equal number of equivalents of diethylene glycol, and (2) a polyol component comprising a polyester polyol or a mixture of a polyester polyol and at least one other polyol.

2. The polyisocyanurate foam of claim 1 wherein the quasi-prepolymer is the reaction product of the organic polyisocyanate and an aromatic polyester polyol.

3. The polyisocyanurate foam of claim 2 wherein the acid component of the aromatic polyester polyol is selected from the group consisting of (a) ester-containing by-products from the manufacture of dimethyl terephthalate, (b) scrap polyalkylene terephthalates, (c) pthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof.

4. The polyisocyanurate foam of claim 2 wherein the polyol component of the aromatic polyester polyol is ethylene glycol.

5. The polyisocyanurate foam of claim 2 wherein the organic polyisocyanate is selected from the group consisting of toluene diisocyanate, diphenylmethane diisocyanate, polymeric MDI, and mixtures thereof.

6. The polyisocyanurate foam of claim 2 wherein polyol component (2) is selected from the group consisting of an aromatic polyester polyol and a mixture of an aromatic polyester polyol and at least one other polyol.

7. The polyisocyanurate foam of claim 6 wherein (a) the quasi-prepolymer is the reaction product of an organic polyisocyanate selected from the group consisting of toluene diisocyanate, diphenylmethane diisocyanate, polymeric MDI, and mixtures thereof, and an aromatic polyester polyol whose polyol component is ethylene glycol, and (b) polyol component (2) is an aromatic polyester polyol.

8. The polyisocyanurate foam of claim 7 wherein the acid component of each aromatic polyester polyol is selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof.

9. The polyisocyanurate foam of claim 8 wherein polyol component (2) is an aromatic polyester polyol whose polyol component is diethylene glycol.

10. The polyisocyanurate foam of claim 7 wherein the quasi-prepolymer is the reaction product of polymeric MDI and an aromatic polyester polyol whose acid component is selected from the group consisting of phthalic anhydride, phthalic acid, and mixtures thereof.

11. The polyisocyanurate foam of claim 10 wherein (a) the quasi-prepolymer is prepared from an aromatic polyester polyol (i) whose acid component is phthalic anhydride and (ii) which is utilized in the preparation of the quasi-prepolymer in an amount of from 2 to 30 percent by weight, relative to the total quasi-prepolymer weight, and (b) polyol component (2) is an aromatic polyester polyol whose acid component is selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof.

12. The polyisocyanurate foam of claim 11 wherein
(a) the quasi-prepolymer is prepared from an aromatic polyester polyol characterized by a free glycol content of from about 0 through 15 percent by weight of the polyester polyol, and a hydroxyl number within the range of from about 190 to 550, and (b) polyol component (2) is an aromatic polyester polyol characterized by a viscosity in cps at 25° C. of about 1,500 to 20,000, a free glycol content of from about 0 through 15 percent by weight of the polyester polyol, and a hydroxyl number within the range of from about 100 to 550.

13. The polyisocyanurate foam of claim 12 wherein polyol component (2) is an aromatic polyester polyol whose acid component is phthalic anhydride and whose polyol component is diethylene glycol.

14. The polyisocyanurate foam of claim 1 wherein the blowing agent is selected from the group consisting of water, air, nitrogen, carbon dioxide, readily volatile organic substances, compounds which decompose to liberate gases, and mixtures thereof.

15. The polyisocyanurate foam of claims 1 wherein the blowing agent is selected from the group consisting of chlorinated and fluorinated hydrocarbons, mixtures of said hydrocarbons, and mixtures of said hydrocarbons with water.

16. The polyisocyanurate foam of claim 1 which includes at least one additive selected from the group consisting of viscosity reducers, flame retardants, dispersing agents, plasticizers, mold release agents, antioxidants, compatibility agents, fillers and pigments.

17. A laminate comprising at least one facing sheet adhered to the polyisocyanurate foam of claim 1.

18. An isocyanate group-terminated quai-prepolymer for use in the preparation of a polyisocyanurate or polyurethane foam comprising the reaction product of
(a) an organic polyisocyanate and
(b) a polyester polyol comprising the reaction product of (i) a polycarboxylic acid component and (ii) ethylene glycol or a mixture of ethylene glycol and at least one other glycol of the formula:

HO—R—OH wherein R is an alkylene radical containing from 3 through 6 carbon atoms, the equivalents of ethylene glycol in the mixture with at least one other glycol being sufficient to reduce the blowing agent requirement of the resultant foam to below the blowing agent reuqirement of the corresponding foam prepared from the same foam-forming composition and having the same trimer level and density except that said equivalents of ethylene glycol in the mixture are replaced by an equal number of equivalents of diethylene glycol.

19. A polyurethane foam comprising the reaction product in the presence of a blowing agent and a catalyst of
(1) an isocyanate group-terminated quasi-prepolymer prepared by reacting
(a) an organic polyisocyanate and
(b) a polyester polyol comprising the reaction product of (i) a polycarboxylic acid component and (ii) ethylene glycol or a mixture of ethylene glycol and at least one other glycol of the formula:

HO—R—OH wherein R is an alkylene radical containing from 3 through 6 carbon atoms, the equivalents of ethylene glycol in the mixture with at least one other glycol being sufficient to reduce the blowing agent requirement of the resultant foam to below the blowing agent requirement of the corresponding foam prepared from the same foam-forming composition and having the same trimer level and density except that said equivalents of ethylene glycol in the mixture are replaced by an equal number of equivalents of diethylene glycol, and
(2) a polyol component comprising a polyester polyol or a mixture of a polyester polyol and at least one other polyol.

20. A laminate comprising at least one facing sheet adhered to the polyurethane foam of claim 19.

21. The quasi-prepolymer of claim 18 wherein the polyester polyol is an aromatic polyester polyol.

22. The quasi-prepolymer of claim 21 wherein the organic polyisocyanate is selected from the group consisting of toluene diisocyanate, diphenylmethane diisocyanate, polymeric MDI, and mixtures thereof.

23. The quasi-prepolymer of claim 22 wherein the organic polyisocyanate is polymeric MDI.

24. The quasi-prepolymer of claim 23 wherein the acid component of the aromatic polyester polyol is selected from the group consisting of phthalic anhydride, phthalic acid, and mixtures thereof.

* * * * *